US007270122B2

(12) United States Patent  
Jones

(10) Patent No.: US 7,270,122 B2
(45) Date of Patent: Sep. 18, 2007

(54) PORTABLE COOKING APPARATUS PROVIDING BOTH DIRECT AND INDIRECT HEAT COOKING

(75) Inventor: Fletcher D. Jones, Vidalia, GA (US)

(73) Assignee: Vidalia Outdoor Products, Vidalia, GA (US)

( * ) Notice: Subject to any disclaimer, the term of this patent is extended or adjusted under 35 U.S.C. 154(b) by 545 days.

(21) Appl. No.: 10/431,565

(22) Filed: May 8, 2003

(65) Prior Publication Data

US 2003/0217647 A1 Nov. 27, 2003

Related U.S. Application Data

(60) Provisional application No. 60/382,030, filed on May 22, 2002.

(51) Int. Cl.
*A47J 37/07* (2006.01)
*F24B 3/00* (2006.01)
*F24C 3/08* (2006.01)

(52) U.S. Cl. ............... 126/25 R; 126/41 R; 126/39 D; 99/450; 99/446

(58) Field of Classification Search .......... 126/25, 126/41 R, 25 B, 39 B, 50, 242, 243, 25 R, 126/39 D; 99/444, 446, 447, 450, 482
See application file for complete search history.

(56) References Cited

U.S. PATENT DOCUMENTS

| 2,746,377 | A | * | 5/1956 | Parks | 99/446 |
| 4,074,675 | A | * | 2/1978 | Dailey | 126/41 R |
| 5,099,821 | A | * | 3/1992 | Ceravolo | 126/25 R |
| 5,878,739 | A | * | 3/1999 | Guidry | 126/25 R |
| 5,983,882 | A | * | 11/1999 | Ceravolo | 126/25 R |
| 6,000,389 | A | * | 12/1999 | Alpert | 126/25 R |

FOREIGN PATENT DOCUMENTS

JP 61-149728 A * 7/1986

* cited by examiner

*Primary Examiner*—Josiah C. Cocks
(74) *Attorney, Agent, or Firm*—Stites & Harbison PLLC; Ross F. Hunt, Jr.

(57) ABSTRACT

A multi-purpose cooking apparatus includes a housing including a direct heat cooking area on one side and an indirect heat cooking area on the other side adjacent to the direct heat cooking area. A burner or burners are disposed beneath the direct heat cooking area. A removable cooking pan, having an open bottom formed by spaced rods, is located, in use, above the burners and below the direct heat cooking area. A removable water pan is interchangeable with the cooking pan and is selectively positionable within the housing in a first position beneath the indirect heat cooking area wherein heated water evaporating from the pan moistens the food, and a second position beneath the direct heat cooking area when the cooking pan is removed, wherein the water pan can be used for steaming as well as boiling and frying.

16 Claims, 2 Drawing Sheets

PORTABLE COOKING APPARATUS PROVIDING BOTH DIRECT AND INDIRECT HEAT COOKING

CROSS-REFERENCE TO RELATED APPLICATION

This application claims benefit of U.S. Provisional Application No. 60/382,030, filed on May 22, 2002.

FIELD OF THE INVENTION

The present invention relates to portable outdoor cooking devices of the type generally referred to as grills, and more particularly to an improved cooking device which, among other important features, provides both indirect and direct heat cooking of food.

BACKGROUND OF THE INVENTION

There are, of course, many different types of standalone, portable grills and cooking devices for use in the outdoor (and indoor) grilling and other cooking of food. These devices range form simple hibachis and other simple charcoal braziers to very elaborate gas grills. While, in general, these devices serve their intended purposes, they are of limited versatility insofar as providing different types of cooking in a single relatively inexpensive unit.

SUMMARY OF THE INVENTION

Generally speaking, in accordance with the invention, a cooking apparatus is provided which offers many features not found on traditional outdoor grills. Because of its unique removable and reversible twin cooking pan construction and its dual direct and indirect cooking areas described below, the cooking apparatus of the invention can grill and sear in common with conventional grills, and can also roast, smoke, steam, bake, boil and even fry without the addition of expensive accessories.

The cooking device of the invention cooks with the convenience of bottled or natural gas, and in accordance with one feature thereof, also provides flavor enhancements from wood or charcoal if desired. According to one preferred embodiment, the latter is achieved by adding a small amount of wood or charcoal to ceramic briquettes (e.g., lava rocks) in one removable cooking pan which has an open bottom formed by spaced parallel rods, and which is positioned, in use, directly over a burner or burners located on the direct heat cooking side of the apparatus. Ashes from the wood or charcoal will accumulate in a removable tray which is located beneath the burner and which slides out after cooking for easy cleaning. The amount of added flavor can be regulated by using more or less wood, charcoal or pellets.

The other side of the apparatus, i.e., the side adjacent to the burner or direct heat cooking side, is used for indirect heat cooking. Because the food is never exposed to a direct flame on this side of the apparatus, there is no problem with flame up. This arrangement also eliminates the need to constantly turn the food to prevent burning. Food cooked on the indirect heat cooking side of the apparatus will only need to be turned one time for complete browning on both sides of the food. One of the removable twin cooking pans, referred to as the liquid pan or water pan, can be placed on this side, and in accordance with a further important cooking feature, the drippings from the food are retained in this pan which becomes very hot when the apparatus is at operating temperatures. In this cooking mode, this pan is partially filled with water and drippings falling into the heated water in the pan to return flavor to the food as the water evaporates. This also provides moisture to the heated air inside the apparatus so that the food remains moist and juicy even if overcooked. By adding other liquid seasonings with the water under the food, the apparatus can also be used to baste and marinate the food as it cooks.

As indicated above, the two cooking pans are reversible or interchangeable, and by simply lifting out or otherwise removing the first, open bottom cooking pan and sliding in the second, water pan from one side of the apparatus to the other side so that the water pan is directly over the burner or burners, the apparatus can be converted into a steamer. Further, foods can be placed in boiling water in the water pan and the apparatus then used to boil and steam at the same time. In addition, instead of water, a small amount of cooking oil can be added to the water pan thereby allowing the user to stir-fry foods or, e.g., to prepare scrambled eggs and pancakes. After such use, the water pan lifts right out for a quick, easy clean up.

In accordance with one aspect of the invention, there is provided a portable multi-purpose cooking apparatus comprising:

a housing including a direct heat cooking area disposed on one side thereof and an indirect heat cooking area disposed on the other side thereof adjacent to the direct heat cooking area;

at least one burner disposed beneath the direct heat cooking area;

a removable cooking pan located, in use, above the at least one burner and below the direct heat cooking area; and a removable liquid pan interchangeable with said cooking pan and selectively positionable within said housing in a first position beneath said indirect heat cooking area and a second position beneath said direct heat cooking area when said cooking pan is removed.

The cooking pan preferably has an open bottom defined by a plurality of spaced, parallel rods extending between opposite sides thereof on which solid heat-producing elements can be disposed. In one advantageous implementation, the heat-producing elements are ceramic briquettes, and the cooking pan includes side walls which, in cooperation with the open bottom thereof, are adapted to the retain the ceramic briquettes in place within the cooking pan.

Preferably, the apparatus further comprises a removable tray located within the housing beneath the at least one burner. As indicated above, additional ash-producing fuels, such as charcoal or wood, can be added to the ceramic briquettes, and the removable tray is positioned so as to catch ash from the ash-producing fuel. Advantageously, the removable tray is slidably mounted within the housing so as to permit sliding of the tray out of the housing to permit cleaning of the tray.

In an important embodiment, the liquid pan includes solid and side bottom walls for holding liquid therein so that, when the liquid pan is positioned in the first position thereof beneath the indirect heat cooking area, liquid contained in the liquid pan is heated and evaporates to provide moisture to food being cooked in the indirect heat cooking area, and drippings from the food are captured in the liquid pan and entrained in the evaporating liquid to help flavor the food, and so that, when the liquid pan is positioned in the second position thereof beneath the direct heat cooking area so as to be heated, in use, by the at least one burner, the liquid pan can hold water for steaming food in the direct heat cooking area and can also hold a cooking liquid for assisting in cooking food contained in the liquid pan. In one implementation, the cooking liquid comprises water and the liquid pan, when positioned in the second position thereof, is used for boiling food received therein. In an alternative implementation, the cooking liquid comprises a cooking oil, and the liquid pan, when disposed in the second position thereof, is used to fry food received therein.

Preferably, the housing includes a first side wall adjacent to the direct heat cooking area, a second side wall adjacent to the indirect heat cooking area, and a principal vent located in the second side wall so that air heated by the at least one burner passes through the indirect heat cooking area before exiting from the housing. The indirect heat cooking area advantageously includes a food rack, and, importantly, the principal vent is located in the second wall at a position below the food rack and above the liquid pan when the liquid pan is positioned in the indirect heat cooking area.

Advantageously, the housing further comprises a further vent located in the first side wall. Preferably, the direct heat cooking area comprises a food rack, and the further vent is located below the food rack of the direct heat cooking area and above the at least one burner.

In a beneficial embodiment, the food rack of the direct heat cooking area and the food rack of the indirect heat cooking area are part of a common food rack or grate removably mounted in said housing.

Preferably, the apparatus further comprises at least one air inlet located in the first side wall adjacent to the at least one burner, and at least one air outlet located in the second side wall at a level beneath that at which the liquid pan is positioned in the first position thereof.

In one advantageous implementation, the at least one burner comprises at least first and second burners disposed in side by side relation.

According to another aspect of the invention, there is provided a portable multi-purpose cooking apparatus comprising:

a housing including a first, direct heat cooking area and a second, indirect heat cooking area adjacent to the direct heat cooking area;

at least one burner disposed in the direct heat cooking area; and a vent in a side wall of the housing adjacent to the indirect heat cooking area so that air heated by said at least one burner in the direct heat cooking area passes through the indirect heat cooking area to provide indirect heating of food in the indirect heat cooking area before exiting from the housing.

Preferably, the apparatus further comprises a grill rack mounted in the housing so as to be disposed in both the direct heat cooking area and the indirect heat cooking area.

In accordance with a further aspect of the invention, there is provided a multi-purpose cooking apparatus comprising:

a housing including a direct heat cooking area disposed on one side thereof and an indirect heat cooking area disposed on the other side thereof adjacent to the direct heat cooking area;

at least one burner disposed beneath the direct heat cooking area; and a removable pan selectively positionable within said housing in (i) a first position beneath said indirect heat cooking area wherein the pan is adapted to receive a liquid which, when heated, evaporates to provide moistening of food being cooked in the indirect heat cooking area, and (ii) a second position beneath said direct heat cooking area and above the at least one burner wherein the pan is adapted to receive a cooking liquid for assisting in cooking food in the direct heat cooking area by heat from the at least one burner.

Preferably, the apparatus further comprises a removable pan located, in use thereof, above the at least one burner and below the direct heat cooking area when the first mentioned removable pan is removed, the further pan having an open bottom defined by a plurality of spaced, parallel rods extending between opposite sides thereof for, in use, receiving solid heat-producing elements. In one implementation, the solid heat-producing elements comprise ceramic briquettes, and the further pan includes side walls which, in cooperation with said open bottom, are adapted to retain the ceramic briquettes in place within the further pan.

Advantageously, the apparatus further comprises a removable tray slidably received within the housing beneath the at least one burner. Advantageously, additional ash-producing fuels (e.g., charcoal and/or wood) can be added to the ceramic briquettes and the removable tray is positioned so as to catch ash from the ash-producing fuel.

Further features and advantages of the present invention will be set forth in, or apparent from, the detailed description of preferred embodiments thereof which follows.

DESCRIPTION OF THE PREFERRED EMBODIMENTS

Figure 1:
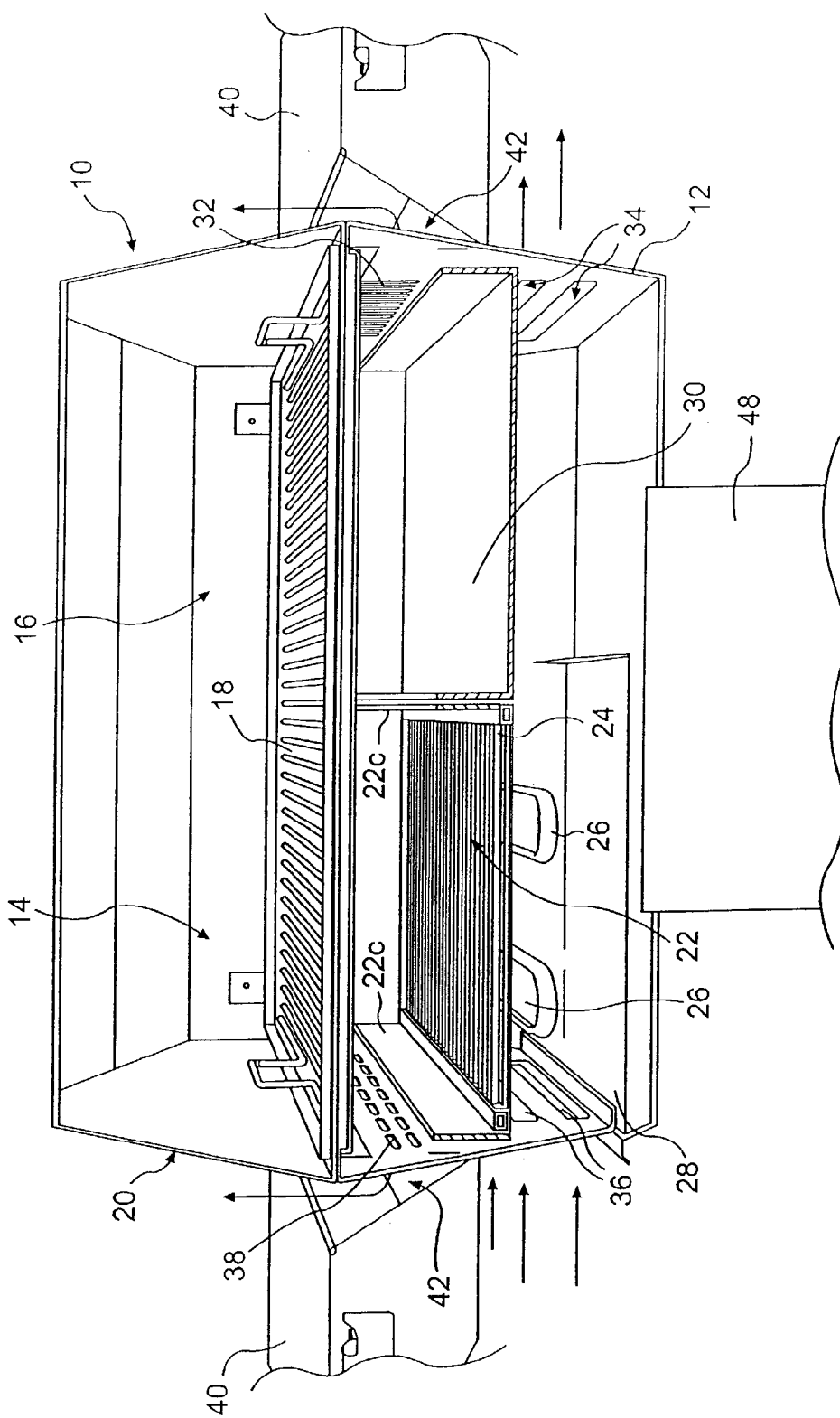
FIG. 1 is a partially broken away front perspective view of a cooking or grilling apparatus in accordance with a preferred embodiment of the invention.
Figure 2:
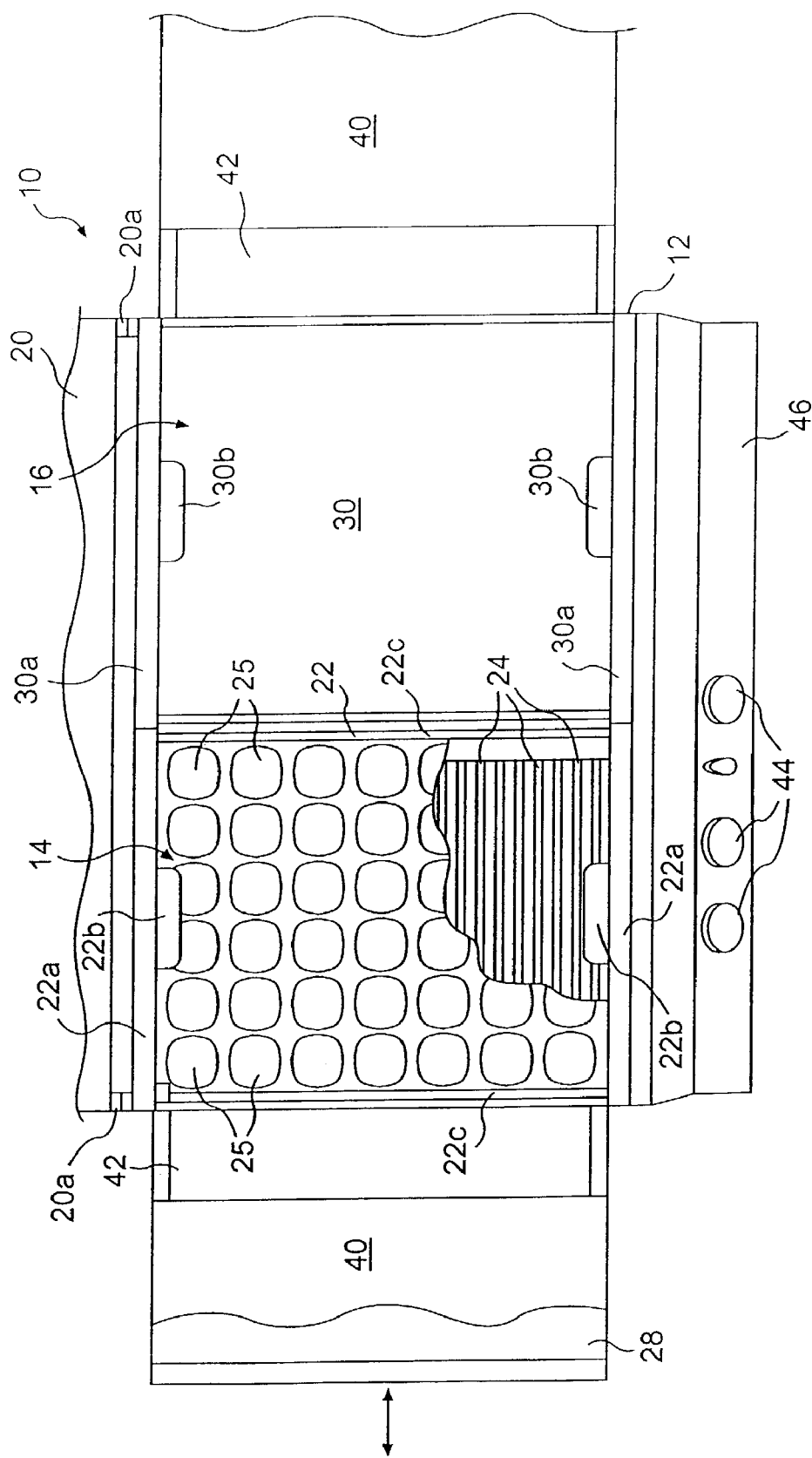
FIG. 2 is a partially broken away top plan view of the apparatus of FIG. 1 with the grill rack and hood raised.

Referring to FIGS. 1 and 2, the cooking apparatus or grill of the invention is generally denoted 10. As shown in FIG. 1, the grill 10 includes a housing 12 and within housing 12, a direct heat cooking area or side 14 and an indirect heat cooking area or side 16. A grill rack or grate 18 common to the two areas 14 and 16 extends completely across an open top portion of housing 12. A hood or cover 20, which is a conventional construction and may be pivotably mounted, as indicated by pivots 20a shown in FIG. 2, to the remainder of housing 12, is adapted to fit over this open top portion.

As indicated above, among the many important features of the invention concerns the provision of a removable or interchangeable briquette cooking pan indicated at 22 in FIGS. 1 and 2. The removable pan 10, which is preferably made of stainless steel, is open at the bottom and, in a preferred embodiment, is lined with ¼ diameter stainless steel rods 24 which extend between opposite sides to provide the open bottom. Advantageously, as shown in FIG. 2, ceramic briquettes 25 are placed on the rods 24 so as to be disposed directly over two burners 26 (see FIG. 1). It will be appreciated that although two burners 26 are shown in FIG. 1, a single, larger burner or, e.g., two pairs of burners, can also be used.

By placing the cooking or briquette pan 22 directly over the burners 26, other fuels such as charcoal or wood can be placed in the briquette pan 22 and can be ignited by the burners 26 instead of using a starter fluid. The grill 10 can thus cook using different fuels at the same time.

As can perhaps be best seen in FIG. 2, cooking pan 22 is mounted on the open top of housing 12 and includes flanges or lips 22a at opposite ends thereof which rest on corresponding positions of housing walls (not shown) that define the open top. Handles 22b help enable pan 22 to be lifted out of housing 12 while side walls 22b of pan 22 assist in confining briquettes in place with pan 22.

A slidable tray 28 is located below burners 26 which is slidably mounted within housing 10 by conventional means such as opposing rails (not shown) on which tray 28 rides, and which slides out from one side of housing 10, as shown in FIG. 2. As fuels such as wood or charcoal burn to ash, the ash falls into the bottom of the grill 10 and accumulates in the tray 28 which slides out for easy cleaning. Further, because tray 28 is located under the burners 26, wood chips can be placed in tray 28 prior to lighting, and since most of the heat produced rises, the chips will burn slowly to provide a smoke flavor to the food being cooked. The ashes from these chips will remain in the tray 28 which, again, slides out for easy cleaning after use.

An interchangeable liquid or water pan is indicated at 30. Similarly to pan 22, pan 30 is also removable by lifting the pan 30 out of housing 12 when grill rack 18 is moved out of the way. Pan 30 is preferably a stainless steel pan having a solid bottom and sides which are welded together or otherwise joined in a watertight manner so as to hold liquids. In the cooking mode illustrated, the pan 30 is on the indirect heat side 16 of the grill 10 and used for indirect heat cooking, i.e., cooking that is indirect because the food in area 16 is not directly over the burners 26.

Food that is to be cooked indirectly is placed on grill rack or grate 18 over the interchangeable water pan 26. Prior to lighting the grill 10 by turning on burners 26, water is first added to the interchangeable water pan 30. When the burners 26 are on, heat rises and fills the entire cooking chamber defined by housing 12 and hood or cover 20. The heat is directed completely around the food and exhausts out through vents 32 and 34 which are described below. One set of vents, the primary vents 32, is located in a side wall 12b of housing 12, under and to one side of the water pan 30, heat flow to vents 32 helps to heat the water in pan 30. As the water becomes heated and evaporates, the evaporating water provides moisture to the food being cooked so the food does not dry out while cooking.

Drippings from the food being cooked fall into the water pan 30 and as these drippings evaporate, they help add flavor to the food. Thus, as food cooks, it is self-basting. The pan 30 can also provide a marinating effect through the addition of other liquids, such as wine or apple cider vinegar, to the water and food drippings in the pan 30.

Similarly, to pan 22, the interchangeable water pan 30 is mounted within the open top of housing 12 by, referring to FIG. 2, flanges or lips 30a at opposite ends thereof that rest on corresponding portions of the end walls of housing 12. As is also shown in FIG. 2, handles 30b at the opposite ends of pan 30 assist in enabling pan 30 to be lifted out for easy cleaning.

The interchangeable cooking or briquette pan 22 and the interchangeable water pan 30 are the same size so that pans 22 and 30 can be rotated or interchanged in the grill 10 for other cooking functions to be carried out. More specifically, by lifting out the interchangeable briquette pan 22 and placing the interchangeable water pan 30 on the direct heat cooking side 14 of the grill 10 (i.e., the side which, as explained above, is directly over the burners 26), the entire grill 10 can be converted to a steamer by adding water to the water pan 30. This water in pan 30 will boil rapidly during operation of grill 10 to produce steam.

In addition, with the pan 30 moved to the direct heat side 14, foods can also be boiled when placed directly in water contained in the water pan 30. Further, by adding cooking oil instead of water to pan 30, the grill 10 can be used for frying.

The primary exhaust for grill 10 is provided by vents 32 which were mentioned above, i.e., the majority of the heat and smoke escapes from the grill 10 through vents 32. The location and size of vents 32 are important to the operation of the grill 10. As illustrated in FIG. 1, the vents 32 are positioned in housing wall 12b on the side of the grill 10 that is farthest away from the burners 26. This arrangement requires the heat to pass over and under the food in order to escape through vents 32. Vents 32 must be vertically positioned above the burners 26 and below the food on rack 18 to achieve the desired results. Positioning vents 32 below the food allows the food to cook evenly without constant turning. Locating the vents 32 higher than the burners 26 is also important. Heated air must escape the grill 10 before back pressure is exerted on the burners 26. This allows for a more efficient burning flame and eliminates the possibility of air in the grill 10 putting out the flame from burners 26 due to excessive back pressure.

Further, water heating vents 34 are also provided as was also mentioned above. These vents 34 are located in the side wall 12b of housing 12 below the interchangeable water pan 30. Part of the heat from the burners 26 passes under the interchangeable water pan 30 thereby helping to evaporate the water in the pan 30. This keeps the food moist and also provides a marinating effect when other liquids are combined with the water.

The burners 26 are preferably stainless steel, gas burners and, as indicated above, are located on the direct heat cooking side 14 of the grill 10. No burners are located on the other, indirect heat cooking side 16 of the grill 10. Direct heat cooking accounts for approximately 50% of the cooking grate or rack area and indirect heat cooking also accounts for approximately 50%. As indicated above, the burners 26 must be located below the primary exhaust vents 32 and below the food that is placed on the cooking grate or rack 18 in order to provide effective, efficient cooking.

Further, air intake vents 36 are located in side wall 12a of housing 12 adjacent to the burners 26 and serve as a source of fresh outside air. Vents 36 also begin the cycle of the air being heated, with the air passing across, under and around the food being cooked prior to its exit at the primary exhaust provided by vents 32.

Secondary exhaust vents 38 are located in side wall 12a of housing 12 on the same side of grill 10 as intake vents 36, and are disposed above the latter. Vents 38 regulate the speed at which air passes through the grill 10. When cooking at higher temperatures, with maximum demand on the burners 26, vents 38 allow excessive heated air to escape before back pressure can affect the incoming air flow which can, in turn, affect the efficiency of burners 26.

Grill 10 further includes oppositely extending platforms or cooling stations 40 on which food can be placed before or after cooking. Platforms 40 are each spaced from housing 12 at the top thereof so as to create exhaust areas 42 through which heated air and smoke from vents 32 and 38 are exhausted.

Grill 10 is otherwise generally conventional and, as shown in FIG. 2, includes various controls 44 on a front panel 46, a support stand or pedestal 48, as well as other conventional constructional features which are common to gas grills and which will not be described here because of their conventional nature.

Briefly considering the operation of the grill 10, as indicated above and is shown in FIG. 1, the cooking area (as viewed in FIG. 1) has a left, direct side 14 and a right, indirect side 16. On the left, direct side 14 of the grill 10 all foods are exposed to a direct flame from burners 26 which are located directly under the food on grate or rack 18. The flame from burners 26 is semi-shielded by the ceramic briquettes, e.g., lava rocks, that are contained in the interchangeable briquette pan 30.

As indicated previously, charcoal or wood can also be used in the briquette pan 30 as alternative or additional fuel choices. As was set forth above, tray 28, located at the base of grill 10, will catch and hold ashes from alternative fuel choices, and slides out for easy cleaning.

On the right or indirect side 16 of the grill 10, there is no direct flame and thus the indirect side 16 relies on hot air being drafted from the burners 26, passing by and across the food and exiting through the primary exhaust 32. Because foods placed on the indirect side of the grill 10 are not located over a direct flame, there is never a chance for a flare up. Further, large items such as whole chickens and turkeys can be cooked without burning or turning. Since food is receiving heat from several directions on the indirect side 16 there is no need for a rotisserie.

As described previously, the water pan 30 catches the drippings from the foods that are being cooked indirectly and returns the flavor to the food by evaporating the drippings that are mixed with the water in the pan, together with any other liquids that are placed in the pan 30 to provide enhanced flavor, such as wine or apple cider vinegar. Any foods that tend to dry out when cooked, such as pork or chicken, greatly benefit from the ability of the grill 10 to cook indirectly and to provide added moisture while cooking.

Although the invention has been described above in relation to preferred embodiments thereof, it will be understood by those skilled in the art that variations and modifications can be effected in these preferred embodiments without departing from the scope and spirit of the invention.

What is claimed:

1. A portable multi-purpose cooking apparatus comprising:
    a housing including a direct heat cooking area disposed on one side thereof and an indirect heat cooking area disposed on the other side thereof adjacent to the direct heat cooking area;
    at least one burner disposed in the direct heat cooking area and the indirect heat cooking area being free of any burner;
    a removable cooking pan located, in use, above the at least one burner in the direct heat cooking area;
    a food rack, comprising a grate including a plurality of rows of openings therein, located in the indirect heat cooking area for receiving food to be cooked by indirect heat in the indirect heat cooking area;
    a vent, positioned below the food rack and disposed in a side wall that partially defines the indirect heat cooking area and that is remote from said at least one burner, so that heat from the at least one burner passes over and under food being cooked in the indirect cooking area to escape through the vent;
    and a removable liquid pan physically interchangeable with said cooking pan and selectively positionable within said housing in a first position in said indirect heat cooking area below the vent and beneath the food rack and a second position in said direct heat cooking area when said cooking pan is removed, said liquid pan including solid side and bottom walls for holding liquid therein so that, when said liquid pan is positioned in the first position thereof in the indirect heat cooking area, the liquid pan contains liquid and the liquid contained in the liquid pan is heated and evaporates to provide moisture to food on the food rack being cooked in the indirect heat cooking area, and drippings from the food are captured in the liquid in the liquid pan and entrained in the evaporating liquid to help flavor the food, and so that, when said liquid pan is positioned in the second position thereof in the direct heat cooking area so as to be heated, in use, by the at least one burner, the liquid pan can hold water for steaming food in the direct heat cooking area and can hold a cooking liquid for assisting in cooking food contained in the liquid pan.

2. An apparatus as claimed in claim 1 further comprising a removable tray located within said housing beneath said at least one burner.

3. An apparatus as claimed in claim 1 wherein said cooking pan has an open bottom defined by a plurality of spaced, parallel rods extending between opposite sides thereof on which solid heat-producing elements can be disposed.

4. An apparatus as claimed in claim 3 wherein the heat-producing elements comprise ceramic briquettes, and said cooking pan includes side walls which, in cooperation with said open bottom, are adapted to the retain the ceramic briquettes in place within said cooking pan.

5. An apparatus as claimed in claim 4 wherein additional ash-producing fuels can be added to the ceramic briquettes and a removable tray is positioned within said housing beneath said at least one burner so as to catch ash from the ash-producing fuel.

6. An apparatus as claimed in claim 5 wherein the removable tray is slidably mounted within the housing so as to permit sliding of the tray out of the housing to permit cleaning of the tray.

7. An apparatus as claimed in claim 1 wherein the cooking liquid comprises water and said liquid pan, when positioned in the second position thereof, is used for boiling food received therein.

8. An apparatus as claimed in claim 1 wherein the cooking liquid comprises a cooking oil and the liquid pan, when disposed in the second position thereof, is used to fry food received therein.

9. An apparatus as claimed in claim 1 wherein said housing includes a first side wall adjacent to the direct heat cooking area, a second side wall adjacent to the indirect heat cooking area, and a principal vent located in the second side wall so that air heated by the at least one burner passes through the indirect heat cooking area before being exhausted from the housing.

10. An apparatus as claimed in claim 9 wherein said housing further comprises a further vent located in said first side wall.

11. An apparatus as claimed in claim 10 wherein said direct heat cooking area comprises a food rack, and said further vent is located below the food rack of the direct heat cooking area and above the at least one burner.

12. An apparatus as claimed in claim 11 wherein the food rack of the direct heat cooking area and the food rack of the indirect heat cooking area are part of a common food rack removably mounted in said housing.

13. An apparatus as claimed in claim 9 further comprising at least one air inlet located in said first side wall adjacent to the at least one burner, and at least one air outlet located in the second side wall at a level beneath that at which the liquid pan is positioned in the first position thereof.

14. An apparatus as claimed in claim 1 wherein the at least one burner comprises at least first and second burners disposed in side by side relation.

15. An apparatus as claimed in claim 1 wherein the indirect heat cooking area is open and free of any burner in a portion thereof located beneath said removable liquid pan.

16. An apparatus as claimed in claim 1 wherein the liquid pan and the cooking pan are of the same size and shape.

* * * * *